United States Patent
Matsunaga et al.

(10) Patent No.: US 6,928,237 B2
(45) Date of Patent: Aug. 9, 2005

(54) FLUID HEATING APPARATUS

(75) Inventors: Ken Matsunaga, Kariya (JP); Hisashi Ieda, Nagoya (JP); Mitsuyo Oomura, Hekinan (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/666,053

(22) Filed: Sep. 17, 2003

(65) Prior Publication Data
US 2004/0065652 A1 Apr. 8, 2004

(30) Foreign Application Priority Data
Sep. 17, 2002 (JP) ........................................ 2002-270092

(51) Int. Cl.$^7$ ................................................. F24H 1/10
(52) U.S. Cl. ..................................... 392/480; 392/497
(58) Field of Search ................................. 392/480, 485, 392/489, 497, 498

(56) References Cited

U.S. PATENT DOCUMENTS 5,872,890 A * 2/1999 LaCombe ................... 392/487
6,205,292 B1 * 3/2001 Pokorny et al. ............. 392/489

FOREIGN PATENT DOCUMENTS

| JP | 7-035407 | 2/1995 |
| JP | 10-287123 | 10/1998 |

* cited by examiner

*Primary Examiner*—Thor S. Campbell
(74) *Attorney, Agent, or Firm*—Harness, Dickey & Pierce, PLC

(57) ABSTRACT

In a fluid heating apparatus, a heat protect temperature sensor indirectly detects temperature of fluid heated by an electric heater adjacent to the electric heater. Also, a heated fluid sensor detects the temperature of the fluid adjacent to a fluid inlet of a heat exchanger. When it is determined that the temperature difference between the detected temperatures exceeds a predetermined level, electric power supply to the electric heater is discontinued. Thus, boil-dry is restricted early with a simple means.

20 Claims, 3 Drawing Sheets

FLUID HEATING APPARATUS

CROSS REFERENCE TO RELATED APPLICATION

This application is based on Japanese Patent Application No. 2002-270092 filed on Sep. 17, 2002, the disclosure of which is incorporated herein by reference.

FIELD OF THE INVENTION

The present invention relates to a fluid heating apparatus suitable for use in a vehicular air conditioner.

BACKGROUND OF THE INVENTION

With regard to a vehicular air-conditioning control device disclosed in JP-A-10-287123, a first thermistor for detecting temperature of a heat generating portion of an electric heater and a second thermistor for detecting temperature of water are disposed in a hot-water tank. When it is determined that the temperature difference between detected temperatures of the first thermistor and the second thermistor exceeds a predetermined level, it is judged that an abnormal condition is encountered. Thus, electric power supply to the electric heater is interrupted.

With regard to a cleaning device for bath hot water disclosed in JP-A-7-35407, hot water in a bath tub is forcedly circulated by a circulation pump and is filtered in a filter tank. Also, the heat of the water is maintained in a thermal insulating heater and activated in an activation tank. A first hot-water temperature sensor is disposed upstream of the thermal insulating heater and a second hot-water temperature sensor is disposed downstream of the thermal insulating heater. When it is determined that the temperature difference between detected temperatures of the first and the second sensors exceeds a predetermined level, it is judged as a shortage of water. Thus, operation of the cleaning device is discontinued.

In a water heating device having a mechanical flow sensor, resistance is caused to a circulation of water. Further, it is required to tightly seal connecting portions of the flow sensor to prevent leaks of the water. Therefore, it is difficult to decrease manufacturing costs of the hot water generating device. Also in a water heating device having an electric flow sensor, it is difficult to decrease the manufacturing costs because an electric circuit is complicated.

Further, in a water heating device that detects an electric current supply to a water pump, a shunt resistor for detecting an electric current is required. This results in increases in size of an electronic control unit and the manufacturing costs. Further, in a water heating device that detects rotation speed of a water pump, a sensor for detecting the rotation speed is required. This results in increases in the water heating device and the manufacturing costs.

SUMMARY OF THE INVENTION

The present invention is made in view of the foregoing matter and it is an object of the present invention to provide a fluid heating apparatus capable of restricting boil-dry with a simple means before it occurs.

According to the present invention, a fluid heating apparatus includes a pump for circulating fluid, a heating device for heating the fluid, a first temperature detecting means for detecting a temperature that changes in accordance with heat generation of the heating device, and a second temperature detecting means for detecting the temperature of the fluid. The second temperature detecting means is disposed downstream from the heating device. When it is determined that a temperature difference between detected temperatures detected by the first temperature detecting means and the second temperature detecting means exceeds a predetermined level, heating operation of the heating device is stopped.

In a case that operation of the pump is stopped for some reason or other and the circulation of the fluid is stopped, the temperature difference between the detected temperatures by the first temperature detecting means and the second temperature detecting means, which are separated from each other, increases greater than a temperature difference of a normal circulation where the fluid normally circulates. Based on this, the heating operation of the heating device is discontinued when it is determined that the temperature difference is greater than the predetermined level. Accordingly, it is possible to restrict boil-dry with a simple means.

The fluid heating apparatus is for example used for a heating apparatus for heating air blown into a compartment. The heating apparatus includes a heat exchanger that performs heat exchange between the fluid heated by the fluid heating apparatus and the air. The second temperature detecting means is disposed adjacent to a fluid inlet of the heat exchanger through which the fluid flows into the heat exchanger.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

First Embodiment

Figure 1:
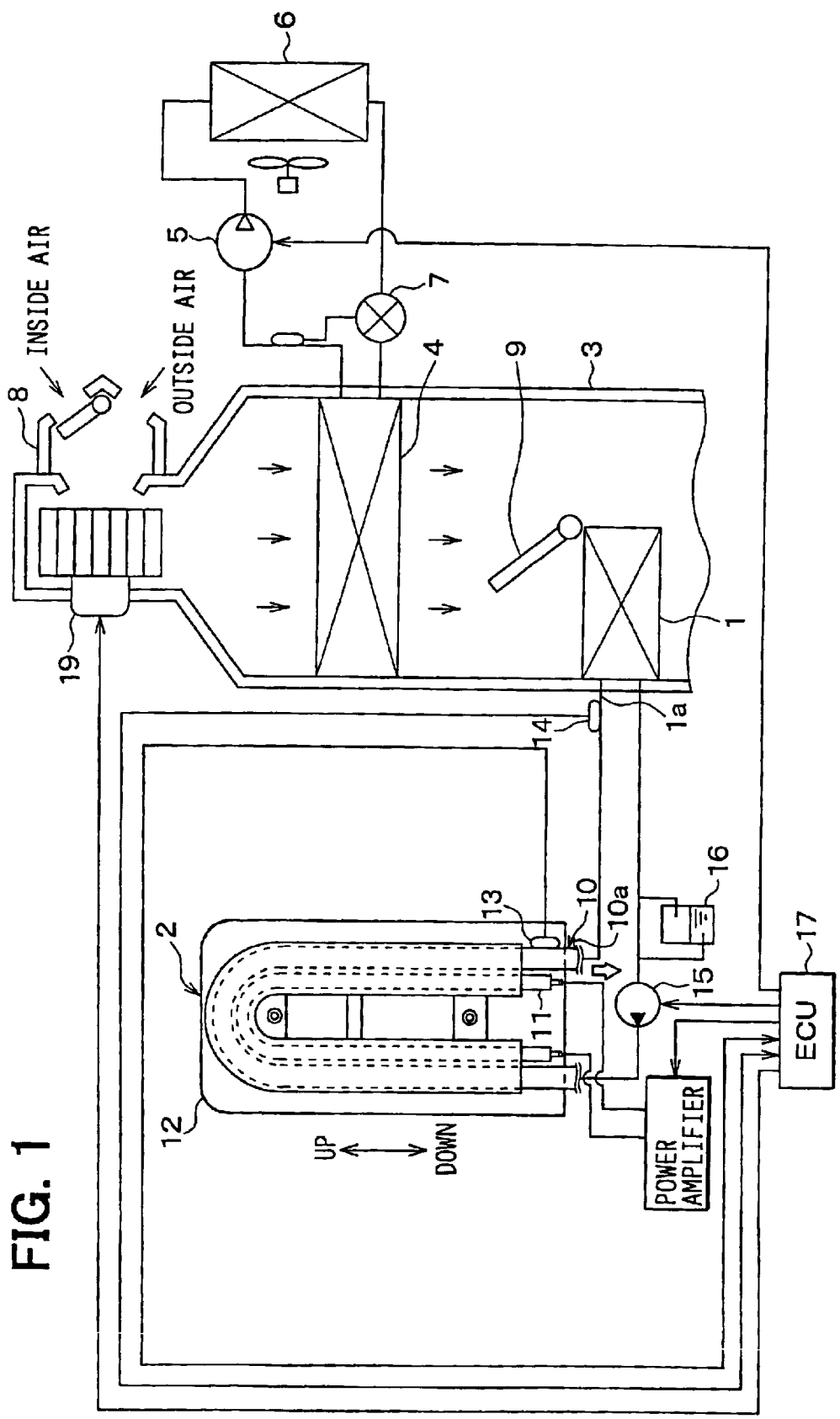
FIG. 1 is a schematic diagram of an air conditioner according to the first embodiment of the present invention.

In the first embodiment, a fluid heating apparatus 2 is used for a vehicular air conditioner, as shown in FIG. 1. A heater 1 is a heat exchanger for performing heat exchange between fluid (e.g. water) heated in the fluid heating apparatus 2 and air to be blown into a passenger compartment of a vehicle. The fluid heating apparatus 2 will be described later in detail.

An air conditioning case 3 is a duct forming an air passage through which the air to be blown into the passenger compartment flows. The heater (hereinafter, heat exchanger) 1 is disposed in the air conditioning case 3. An evaporator 4 is disposed air-upstream of the heat exchanger 1 in the air conditioning case 3. The evaporator 4 constructs an air cooling means for cooling the air.

The evaporator 4 is included in a vapor compression refrigerant cycle system, which transfers heat of a low-temperature refrigerant to a high-temperature refrigerant, as a low-pressure side heat exchanger. The vapor compression refrigerant cycle system also includes a compressor 5, a radiator 6 for cooling high-pressure and high-temperature refrigerant, which is discharged from the compressor 5, a pressure reducing device 7 for decompressing and expanding the high pressure refrigerant, which is cooled in the radiator 6. In the embodiment, the compressor 5 is driven by an electric motor.

A blower 19 is disposed air-upstream of the evaporator 4. An inside and outside air switching unit 8 is provided on a side of an air inlet of the blower 19. The inside and outside air switching unit 8 controls volumes of inside air inside of the passenger compartment and outside air outside of the passenger compartment and introduces the air into the blower 19.

In the air conditioning case 3, an air mixing door 9 is disposed air upstream of the heat exchanger 1. The air mixing door 9 controls volumes of air to be heated by the heat exchanger 1 and the cooled air bypassing the heat exchanger 1, thereby constructing a temperature adjusting means for adjusting temperature of the air to be blown into the passenger compartment.

Next, the fluid heating apparatus 2 will be described.

A pipe 10 through which the fluid flows includes a curved portion. The curved portion for example has substantially a U-shape, as shown in FIG. 1. The pipe 10 is disposed such that the open portion of the U-shape faces down and the turn portion of the U-shape is located higher than the open portion, as denoted by a up and down arrow in FIG. 1. The electric heater 11 such as a sheathed heater is disposed to be in contact with an outside wall of the U-shaped portion of the pipe 10, so that the electric heater 11 heats the U-shaped portion. The electric heater 11 and the pipe 10 are integrated and embedded in a metal member such as aluminum having high heat conductivity.

A protect casing 12 is a cover encasing the electric heater 11 for protecting the electric heater 11 and the heated portion of the pipe 10. A heat insulator such as resin or glass wool is provided on an inside wall of the protect casing 12.

A heat protect temperature sensor (first sensor) 13 is disposed at a position (a first position of a fluid passage) proximate to a downstream portion 10$a$ of the heated portion of the pipe 10. The first sensor 13 detects the temperature of a wall of the pipe 10 proximate to the downstream portion 10$a$. Thus, the first sensor 13 indirectly detects the temperature of the heated fluid at a position proximate to the downstream portion 10$a$ of the heated portion. That is, the first sensor 13 detects the temperature that increases or changes in accordance with heat generation of the electric heater 11. Here, the first sensor 13 constructs a first temperature detecting means.

A heated fluid sensor (second sensor) 14 detects the temperature of the wall of the pipe 10 at a fluid inset (a second position of the fluid passage) 1$a$ of the heat exchanger 1, thereby indirectly detecting temperature of the heated fluid. The second sensor 14 is disposed downstream from the first sensor 13 so that the second sensor 14 detects temperature of the heated fluid downstream from the first sensor 13. The second sensor 14 constructs a second temperature detecting means.

An electric pump 15 and a reserve tank 16 are disposed in the fluid passage. The electric pump 15 circulates the fluid and the reserve tank 16 absorbs change in a volume of the fluid circulating in the fluid heating apparatus 2. Electric devices such as the electric heater 11 and the pump 15 are controlled by an ECU (electronic control unit) 17.

Figure 2:
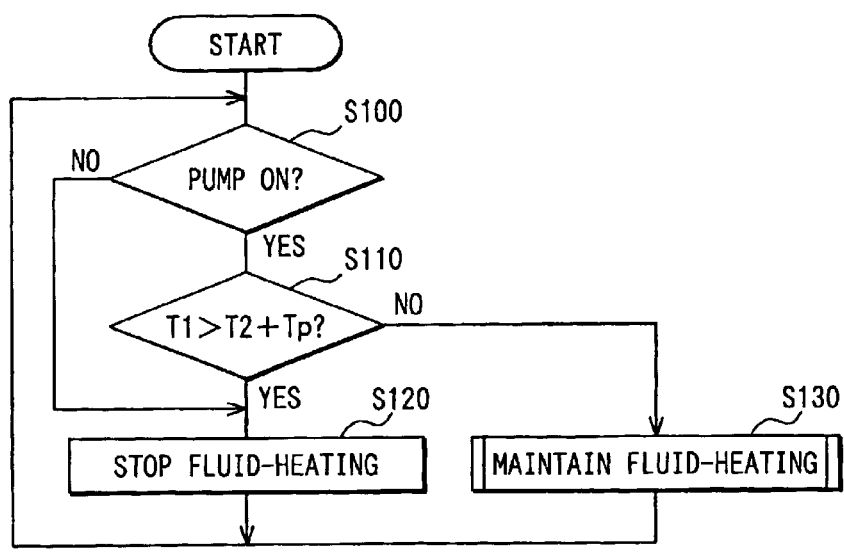
FIG. 2 is a flow chart of control of the air conditioning apparatus according to the first embodiment of the present invention.

Next, a characteristic operation of the embodiment will be described with reference to a flow chart shown in FIG. 2.

First, when the air conditioning unit is turned on, it is determined whether an operation signal is sent to the pump 15 from the ECU 17 at S100. If it is determined that the operation signal is sent to the pump 15, it is determined whether a temperature difference $\Delta T$ between a detected temperature T1 of the first sensor 13 and a detected temperature T2 of the second sensor 14 exceeds a predetermined level Tp at S110.

If it is determined that the temperature difference $\Delta T$ is greater than the predetermined level Tp, electric power supply to the electric heater 11 is interrupted so that a heating operation of the electric heater 11 is stopped at S120. If it is determined that the temperature difference $\Delta T$ is equal to or less than the predetermined level Tp, the rate of the electric power supply to the electric heater 11 is controlled so that the detected temperature T2 of the heated fluid sensor 14 reaches a target level at S130. This step constructs a fluid heating rate control means. Specifically, the target level is set as a target temperature of the heated fluid flowing into the heat exchanger 1. The target level is previously calculated by a target temperature calculating means.

Next, advantageous effects of the embodiment will be described.

In a case that the operation of the pump 15 is stopped for some reason or other, the circulation of the heated fluid is stopped. Since the heated fluid is not supplied to the heat exchanger 1, the temperature difference $\Delta T$ becomes greater than that of a normal operation where the heated fluid normally circulates.

Based on this fact, the electric power supply to the electric heater 11 is stopped when the temperature difference $\Delta T$ is greater than the predetermined level Tp. Therefore, it is possible to restrict boil-dry with a simple means before it occurs.

When the circulation of the heated fluid is stopped, the detected temperature T1 of the first sensor 13 is higher than that of the normal circulation. Therefore, it is considered to stop the electric power supply to the electric heater 11 when the detected temperature T1 exceeds a predetermined temperature by assuming that the operation of the pump 15 is stopped.

Specifically, the target temperature of the second sensor 14 is 80 degrees Celsius and the detected temperature T1 of the first sensor 13 is 82 degrees Celsius while the heated fluid circulates normally, for example. When the detected temperature T1 of the first sensor 13 exceeds the predetermined temperature (e.g. 110 degrees Celsius), the electric power supply to the electric heater 11 is stopped. In this case, the electric power supply to the electric heater 11 continues so that the detected temperature T1 (82 degrees Celsius) increases by 28 degrees, that is, the electric power supply to the electric heater 11 is maintained until the detected temperature T1 reaches the predetermined temperature (110 degrees Celsius).

In the embodiment, the heated fluid is cooled in the heat exchanger 11. That is, when the heated-fluid supply from the electric heater 11 is stopped, the detected temperature T2 of the second sensor 14 decreases, while the detected temperature T1 of the first sensor 13 increases. Therefore, the increase of the temperature difference $\Delta T$ is greater than the increase of the detected temperature T1 of the first sensor 13.

Accordingly, since the boil-dry is judged based on the temperature difference $\Delta T$ in the embodiment, the boil-dry is detected at a stage earlier than the case of judging it based on only the detected temperature T1 of the first sensor 13.

In the embodiment, the boiling point of the fluid is 110 degrees Celsius. The temperature difference ΔT is 3 degrees while the fluid normally circulates. In addition, the predetermined level Tp of the temperature difference ΔT is 10 degrees in consideration of detecting accuracy.

Second Embodiment

Figure 3:
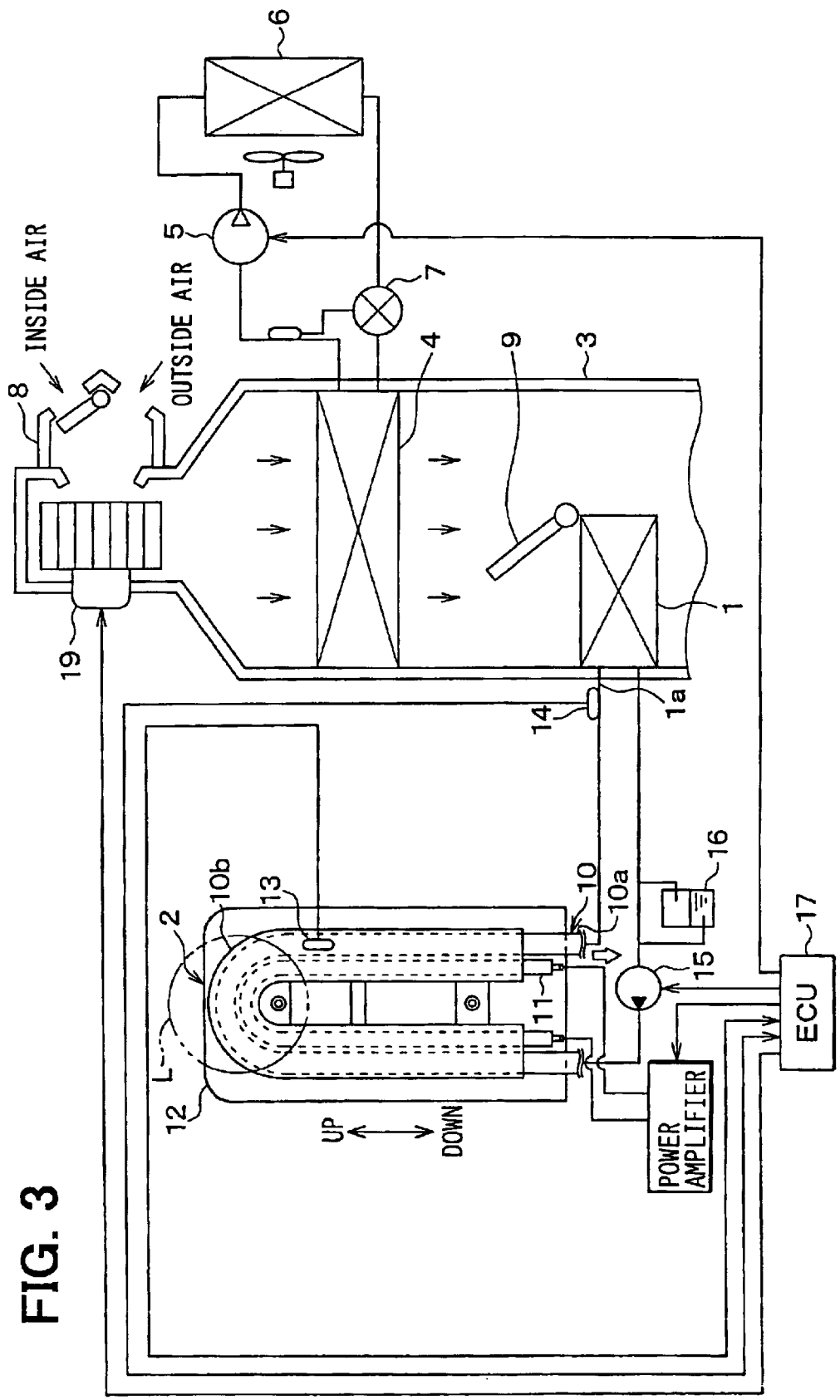
FIG. 3 is a schematic diagram of an air conditioner according to the second embodiment of the present invention.

As shown in FIG. 3, in the second embodiment, the first sensor 13 is arranged at a position proximate to a turn portion 10*b* of the curved portion of the pipe 10, which is heated by the electric heater 11. Here, the position proximate to the turn portion 10*b* includes the turn portion 10*b* itself, which is denoted by a chain double-dashed circle L in FIG. 3.

The first sensor 13 is attached on the surface of the metal member, which integrates the electric heater 11 and the pipe 10, at the position proximate to the turn portion 10*b* and indirectly detects the temperature of the heated fluid. Since the heat conductivity of the aluminum is higher than that of stainless forming the pipe 10, the detected temperature T1 of the first sensor 13 of the second embodiment is higher than that of the detected temperature T1 of the first embodiment with respect to the same heated fluid temperature.

Next, effects of the embodiment will be described.

When the circulation of the heated fluid is stopped, the fluid boils locally and causes bubbles. Because the bubbles collect at the upper portion, which is an apex or a proximity to the apex, of the heated portion of the pipe 10, the temperature of the upper portion of the pipe 10 increases in accordance with an increase in pressure. Based on this, because the first sensor 13 is arranged proximate to an upper half of the electric heater 11, the temperature change is accurately detected. Accordingly, it is possible to detect the boil-dry at an early stage.

In general, a straight electric heater generates heat most in substantially a middle portion in its longitudinal direction. In the embodiment, since the first sensor 13 is arranged proximate to the turn portion 10*b* of the heated portion, the location of the first sensor 13 generally corresponds to a portion where heat generation is highest within the electric heater 11. Accordingly, since the change in the temperature is accurately determined, the boil-dry can be detected early.

Other Embodiments

In the above embodiments, the fluid heating apparatus 2 is used for the air conditioner. However, the present invention is not limited to the above. The present invention can be used for a hot water supplying device, for example.

Further, the electric heater 11 is not limited to the sheathed heater. Another heating device such as a gas heater can be used in place of the electric heater 11.

The shape of the heated portion of the pipe 10 is not limited to substantially U-shape. Alternatively, the heated portion of the pipe 10 can have for example a W-shape or a straight shape.

The arranging position of the first sensor 13 is not limited to the positions of the above-described embodiments.

The present invention should not be limited to the disclosed embodiments, but may be implemented in other ways without departing from the spirit of the invention.

What is claimed is:

1. A fluid heating apparatus comprising:
    a pump for circulating fluid through a fluid passage;
    a heating device for heating the fluid;
    first temperature detecting means for detecting temperature at a first position of the fluid passage which is located adjacent the heating device and is heated by the heating device;
    second temperature detecting means for detecting a temperature at a second position of the fluid passage which is spaced from the heating device on a down stream side of the heating device and is thermally isolated from the heating device more than the first temperature detecting means;
    control means for controlling the heating device wherein when the temperature detected by the first temperature detecting means exceeds a predetermined level higher than the temperature detected by the second temperature detecting means, the control means stops heating operation of the heating device.

2. The fluid heating apparatus according to claim 1, wherein the first temperature detecting means detects a temperature of a pipe forming the fluid passage.

3. The fluid heating apparatus according to claim 1, wherein the first temperature detecting means detects a temperature proximate to a pipe forming the fluid passage.

4. The fluid heating apparatus according to claim 1, wherein the heating device heats a portion of a pipe, which forms the fluid passage, wherein the first temperature detecting means detects a temperature at a position proximate to a downstream portion of the heated portion of the pipe.

5. The fluid heating apparatus according to claim 1, wherein the first temperature detecting means is disposed at a position proximate to an upper half of the heating device.

6. The fluid heating apparatus according to claim 1, wherein a portion of the fluid passage that is heated by the heating device includes a curved portion, wherein the first temperature detecting means is disposed proximate to the curved portion.

7. The fluid heating apparatus according to claim 6, wherein the first temperature detecting means is disposed proximate to an apex of the curved portion.

8. A heating apparatus for heating air comprising:
    a pump for circulating fluid;
    a heating device for heating the fluid;
    a heat exchanger for performing heat exchange between the air and the fluid heated by the heating device, the heat exchanger being spaced from the heating device on a downstream side of the heating device;
    a first sensor for detecting a temperature of the fluid around the heating device; and
    a second sensor for detecting a temperature of the fluid at a position which is spaced from the heating device on the downstream side of the heating device and which is proximate to a fluid inlet of the heat exchanger; and
    control means for controlling the heating device wherein when the temperature detected by the first sensor is greater than the temperature detected by the second sensor by a predetermined level, the control means stops heating operation of the heating device.

9. The heating apparatus according to claim 8, further comprising:
    a target temperature determining means for determining a target temperature of the fluid flowing into the heat exchanger; and
    a controlling means for controlling operation of the heating device such that the detected temperature of the second sensor reaches the target temperature.

10. The heating apparatus according to claim 8, wherein the heating device heats a portion of a fluid passage through which the fluid is circulated, wherein the first sensor detects a temperature proximate to a downstream portion of the heated portion of the fluid passage.

11. The heating apparatus according to claim 8, wherein a portion of a fluid passage through which the fluid is circulated is heated by the heating device and has a curved portion and the first sensor detects a temperature proximate to an apex of the curved portion.

12. The fluid heating apparatus according to claim 1, wherein the fluid heating apparatus is for a vehicular air conditioner.

13. The fluid heating apparatus according to claim 1, wherein:
the first temperature detecting means indirectly detects the temperature of the fluid in the fluid passage through a wall of the fluid passage at the first position of the fluid passage; and
the second temperature detecting means indirectly detects the temperature of the fluid in the fluid passage through the wall of the fluid passage at the second position of the fluid passage.

14. The heating apparatus according to claim 8, wherein:
the heating apparatus is for a vehicular air condition; and
the heat exchanger performs heat exchange between the fluid heated by the heating device and air to be blown into a passenger compartment of a vehicle.

15. A heating apparatus for heating fluid circulated by a pump, the fluid being supplied to a heat exchanger for heating air by the fluid, the apparatus comprising:
a heating device for heating the fluid, the heating device being located upstream in a fluid passage with respect to the heat exchanger;
a heat fluid sensor located on a fluid downstream side to the heating device, the heat fluid sensor being responsive to a temperature of the fluid heated by the heating device and supplied to the heat exchanger;
a heat protect sensor located on a position closer to the heating device than that of the heat fluid sensor, the heat protect sensor being responsive to a temperature directly reflecting heat generation of the heating device;
a controller which performs as a heating rate controller and a protective controller, wherein
the heating rate controller controls a rate of power supply to the heating device in response to the heat fluid sensor so that the heat exchanger is supplied with the fluid heated by the heating device in a predetermined level, and
the protective controller interrupts power supply to the heating device in response to both the heat fluid sensor and the heat protect sensor, the protective controller interrupts the power supply when the temperature detected by the heat protect sensor exceeds the temperature detected by the heat fluid sensor by a predetermined temperature.

16. The heating apparatus according to claim 15, wherein the heating rate controller controls the rate only when the protective controller enables the power supply to the heating device.

17. The heating apparatus according to claim 16, wherein the protective controller interrupts power supply to the heating device when the pump is not operated.

18. The heating apparatus according to claim 16, wherein the protective controller interrupts power supply to the heating device when the pump is not operated.

19. The heating apparatus according to claim 15, wherein
the heat fluid sensor is located on a fluid inlet of the heat exchanger, and
the heat protect sensor is disposed on a pipe in which the fluid flows, the heat protect sensor being located on a position just downstream of a heated portion where the pipe and the heating device are thermally coupled.

20. The heating apparatus according to claim 15, wherein
the heat fluid sensor is located on a fluid inlet of the heat exchanger, and
the heat protect sensor is disposed on a member which covers a pipe in which the fluid flows and the heating device.

* * * * *